United States Patent
Ohta et al.

(10) Patent No.: US 8,192,714 B2
(45) Date of Patent: *Jun. 5, 2012

(54) METHOD FOR MANUFACTURING CARBON NANOTUBES

(75) Inventors: Kazuchika Ohta, Nagano (JP); Ick-Soo Kim, Nagano (JP); Byoung-Suhk Kim, Nagano (JP); Jongchul Park, Seoul (KR)

(73) Assignee: Shinshu University, Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/534,262

(22) Filed: Aug. 3, 2009

(65) Prior Publication Data

US 2010/0196247 A1  Aug. 5, 2010

Related U.S. Application Data

(63) Continuation-in-part of application No. PCT/JP2009/051861, filed on Feb. 4, 2009.

(51) Int. Cl.
*D01F 9/12* (2006.01)
*B01J 19/08* (2006.01)

(52) U.S. Cl. ............... 423/447.1; 977/842; 977/844; 204/157.47

(52) U.S. Cl. ..............................................................

(58) Field of Classification Search .... 423/447.1–447.3, 423/445 B; 977/742–754, 842–848; 428/367; 204/157.4, 157.47

See application file for complete search history.

(56) References Cited

U.S. PATENT DOCUMENTS

| | | | | |
|---|---|---|---|---|
| 6,066,290 | A | * | 5/2000 | Dennis et al. ............. 419/38 |
| 2007/0020168 | A1 | * | 1/2007 | Asmussen et al. ......... 423/447.3 |
| 2007/0140947 | A1 | | 6/2007 | Schneider et al. |
| 2008/0233041 | A1 | | 9/2008 | Jang et al. |

FOREIGN PATENT DOCUMENTS

| | | |
|---|---|---|
| JP | 6040711 A | 2/1994 |
| JP | 6080391 B | 10/1994 |
| JP | 6287010 A | 10/1994 |
| JP | 2007145674 A | 6/2007 |
| JP | 2007516923 A | 6/2007 |
| JP | 2008044840 A | 2/2008 |
| JP | 2008273807 A | 11/2008 |
| JP | 2008280195 A | 11/2008 |

OTHER PUBLICATIONS

Ohta, et al., Development of Facile SyntheticMethods of Carbon Nanotubes and Nanocapsules by Using a Domestic Microwave Oven, Global Congress on Microwave Energy Applications) Aug. 4-8, 2008 MAJIC 1st Proceedings, "The New Flame for Humanity,".*

Park, et al., Effects of iron catalyst on the formation of crystalline domain during carbonization of electrospun acrylic nanofiber, Synthetic Metals 2005; 150: 265-270.*

(Continued)

*Primary Examiner* — Daniel C. McCracken
(74) *Attorney, Agent, or Firm* — Lowe Hauptman Ham & Berner LLP (57) ABSTRACT

A method for manufacturing carbon nanotubes of the present invention includes the steps of: preparing at least one metal selected from a group consisting of iron, cobalt and nickel and an organic compound: and forming carbon nanotubes by using the organic compound as a carbon source, wherein the metal and the organic compound are put into a heating vessel having a substance capable of converting electromagnetic energy into heat, and the organic compound is brought into contact with the metal in a state where the inside of the heating vessel is heated at a temperature of 600° C. to 900° C. by applying the electromagnetic energy to the heating vessel so as to form the carbon nanotubes.

16 Claims, 4 Drawing Sheets

OTHER PUBLICATIONS

Ko, et al., Purification of multi-walled carbon nanotubes through microwave heating of nitric acid in a closed vessel, Carbon 2005; 43: 727-733.*

Geng, et al., Direct conversion of nickel stearate into carbon nanotubes or pure-phase metallic Ni nanoparticles encapsulated in polyhedral graphite cages, J. Mater. Chem. 2005; 15: 844-849.*

GCMEA (Global Congress on Microwave Energy Applications) Aug. 4-8, 2008 MAJIC 1st Proceedings, "The New Flame for Humanity".

Junfeng Geng et al., "Direct conversion of nickel stearate into carbon nanotubes or pure-phase metallic Ni nanoparticles encapsulated in polyhedral graphite cages," J. Matter Chem., 2005, 15, pp. 844-849.

Jin-Huan Huang et al., "Selective growth of carbon nanotubes on nickel oxide templates created by atomic force microscope nano-oxidation," Diamond & Related Materials, 14, 2005, pp. 744-748.

Chia-Chih Chuang et al., "The role of Ti interlayer in carbon nanotube growth," Surface & Coatings Technology, 202, 2008, pp. 2121-2125.

* cited by examiner

METHOD FOR MANUFACTURING CARBON NANOTUBES

RELATED APPLICATIONS

The present application is a continuation-in-part of International Application Number PCT/JP2009/051861 filed Feb. 4, 2009, the disclosure of which is hereby incorporated by reference herein in its entirety.

TECHNICAL FIELD

The present invention relates to a method for manufacturing carbon nanotubes. To be more specific, the present invention relates to a method for manufacturing carbon nanotubes within a short time using an inexpensive device such as a microwave oven for household use.

BACKGROUND OF THE INVENTION

Carbon nanotubes are generally manufactured by an arc discharge method, a laser abrasion method, a chemical vapor deposition method (CVD method) or the like. Besides these methods, there has been also reported a method which manufactures carbon nanotubes made of nickel stearate using an electric furnace (see non-patent document 1).

This method can manufacture carbon nanotubes by heating nickel stearate in an electric furnace under argon atmosphere at a temperature of 800° C. to 1000° C.

Non-Patent Document: Junfeng Geng and two others, "Journal of Materials Chemistry", 2005, vol. 15, p. 844-849

DISCLOSURE OF THE INVENTION

Problems to be Solved by the Invention

According to the method described in non-patent document 1, it is possible to manufacture carbon nanotubes under mild conditions using an inexpensive device compared to an arc discharge method, a laser abrasion method or a CVD method. However, in manufacturing carbon nanotubes using an electric furnace, the increase of temperature up to the formation temperature for forming carbon nanotubes from room temperature takes an extremely long time such as several hours, and the lowering of the temperature to room temperature after forming carbon nanotubes also takes an extremely long time such as several hours. Further, there has also been a demand for the introduction of a method for manufacturing carbon nanotubes using a heating device which is less expensive than an electric furnace.

The present invention has been made under such circumstances, and it is an object of the present invention to provide a method for manufacturing carbon nanotubes within a short time using an inexpensive heating device.

Means for Solving the Problems

The inventors of the present invention have made extensive studies to achieve the above-mentioned object, and have completed the present invention based on the following finding. That is, it was found that by applying electromagnetic energy to an organic compound and a catalyst for forming carbon nanotubes in an environment where electromagnetic energy is converted into heat, the organic compound is brought into contact with the catalyst so that carbon nanotubes can be manufactured using an inexpensive heating device within a short time.

The present invention has been made based on such finding.

According to one aspect of the present invention, there is provided a method for manufacturing carbon nanotubes which includes the steps of: preparing at least one metal selected from a group consisting of iron, cobalt and nickel and an organic compound: and forming carbon nanotubes by using the organic compound as a carbon source, wherein the metal and the organic compound are put into a heating vessel having a substance capable of converting electromagnetic energy into heat, and the organic compound is brought into contact with the metal in a state where the inside of the heating vessel is heated at a temperature of 600° C. to 900° C. by applying the electromagnetic energy to the heating vessel so as to form the carbon nanotubes.

In the above-mentioned method for manufacturing carbon nanotubes, the method may preferably further include a step of putting the metal and the organic compound into a reaction vessel in a state where the metal and the organic compound are separated from each other between the step of preparing the metal and the organic compound and the step of forming the carbon nanotubes, and in the step of forming the carbon nanotubes, the organic compound may be brought into contact with the metal in the inside of the reaction vessel.

In the above-mentioned method for manufacturing carbon nanotubes, in the step of forming the carbon nanotubes, the reaction vessel may preferably be placed in the inside of the heating vessel and, thereafter, the electromagnetic energy is applied to the heating vessel so as to heat the inside of the heating vessel at a temperature of 600° C. to 900° C.

In the above-mentioned method for manufacturing carbon nanotubes, in the step of forming the carbon nanotubes, the reaction vessel may preferably gradually pass through the heating vessel in a state where the inside of the heating vessel is heated at a temperature of 600° C. to 900° C. by applying the electromagnetic energy to the heating vessel.

In the above-mentioned method for manufacturing carbon nanotubes, in the step of forming the carbon nanotubes, in a state where a predetermined longitudinal portion of the heat resistant tube is arranged in the inside of the heating vessel, the reaction vessel may preferably gradually pass through the heating vessel by gradually moving the reaction vessel in the heat resistant tube in the longitudinal direction.

In the above-mentioned method for manufacturing carbon nanotubes, in the step of putting the metal and the organic compound into the reaction vessel, the metal may preferably be put into the reaction vessel in a state where the metal is fixed to an upper portion of the reaction vessel, and the organic compound may preferably be put into a lower portion of the reaction vessel.

In the above-mentioned method for manufacturing carbon nanotubes, the reaction vessel may preferably be a crucible, and the metal may preferably be coated to the inner surface of the top plate of the crucible in the step of putting the metal and the organic compound into the reaction vessel.

In the above-mentioned method for manufacturing carbon nanotubes, in the step of putting the metal and the organic compound into the reaction vessel, a periphery of the crucible may preferably be coated with clay after the metal and the organic compound are put into the crucible.

In the above-mentioned method for manufacturing carbon nanotubes, the step of forming the carbon nanotubes may preferably include a step of feeding an inert gas and the organic compound to the inside of the heating vessel.

In the above-mentioned method for manufacturing carbon nanotubes, the metal may preferably be nickel.

In the above-mentioned method for manufacturing carbon nanotubes, the organic compound may preferably be a stearic acid.

In the above-mentioned method for manufacturing carbon nanotubes, the substance capable of converting electromagnetic energy into heat may preferably be at least one selected from a group of substances consisting of a alumina, mullite, ferrite, silicon nitride and silicon carbide.

According to the method for manufacturing carbon nanotubes of the present invention, it is possible to manufacture carbon nanotubes using an inexpensive heating device within a short time.

BEST MODE FOR CARRYING OUT THE INVENTION

A method for manufacturing carbon nanotubes of the present invention is explained hereinafter based on embodiments shown in drawings.

Embodiment 1

Figure 1:
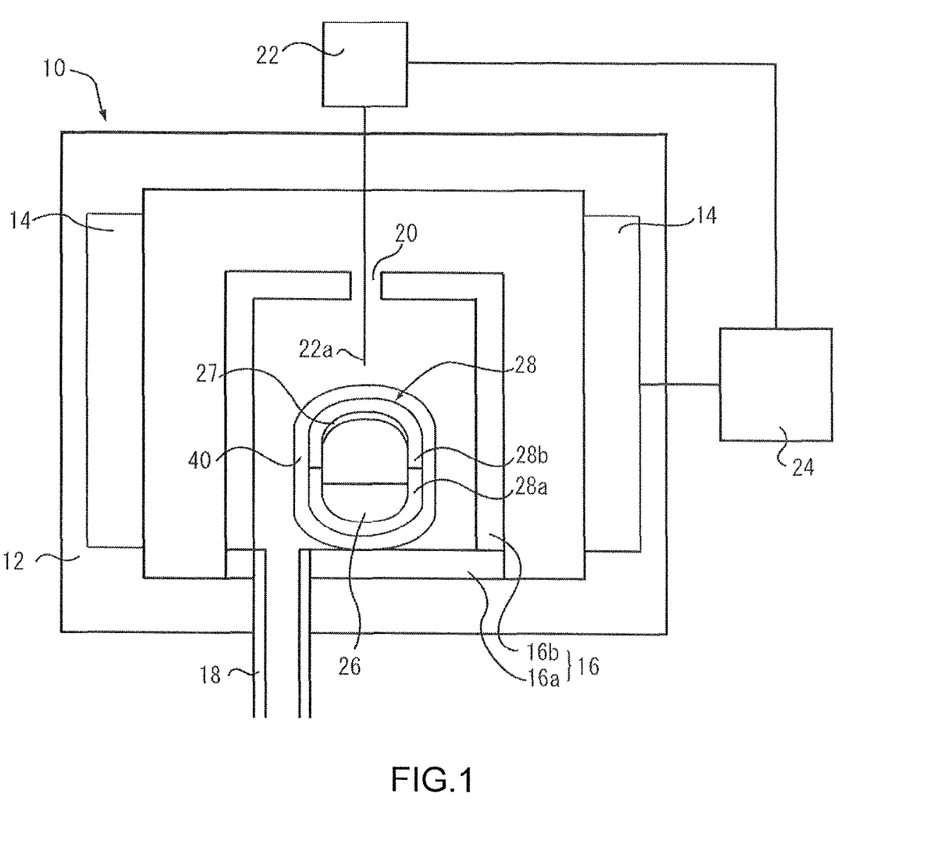
FIG. 1 is a schematic cross-sectional view of a manufacturing apparatus used in a method for manufacturing carbon nanotubes according to an embodiment 1.
Figure 2A:
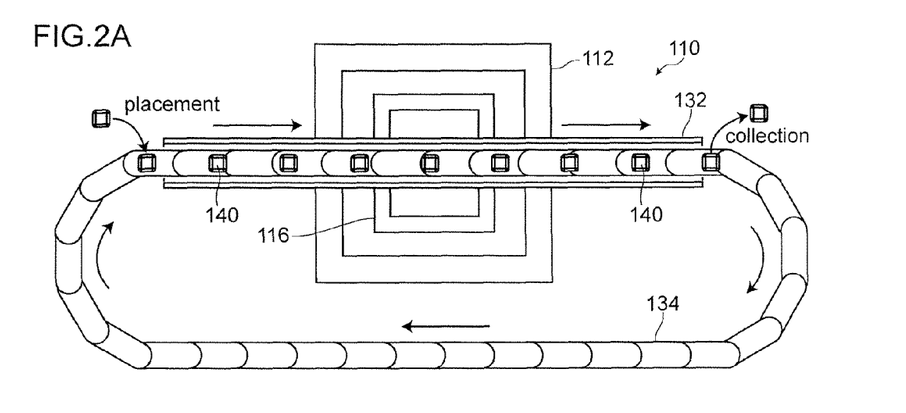
FIG. 2 is a schematic view for explaining a manufacturing apparatus used in a method for manufacturing carbon nanotubes according to an embodiment 2.
Figure 2B:
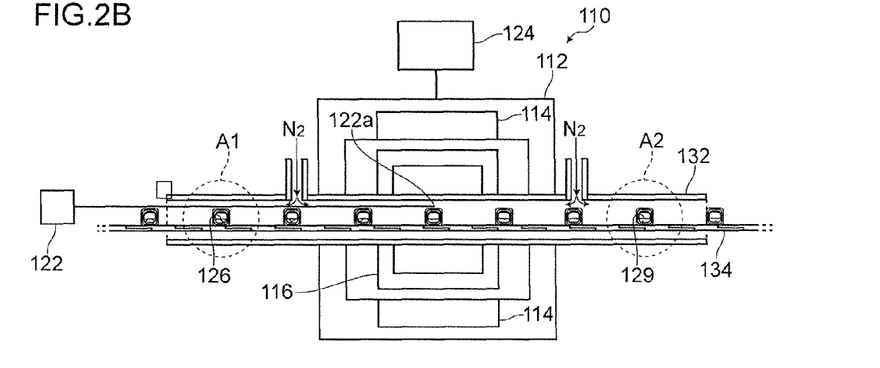
Figure 2C:
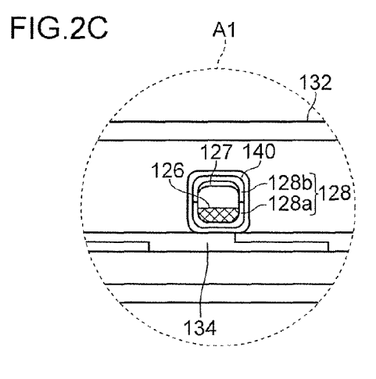
Figure 2D:
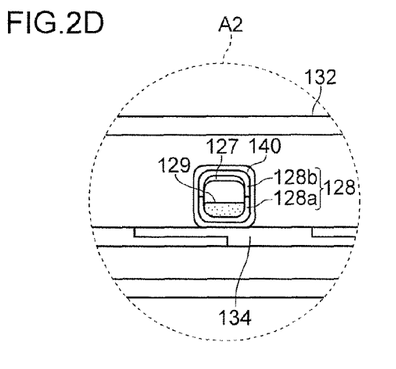

FIG. 1 shows a manufacturing apparatus 10 used in a method for manufacturing carbon nanotubes according to an embodiment. The manufacturing apparatus 10 includes an outer vessel 12, an electromagnetic source 14, a heating vessel 16, a gas introducing pipe 18, a gas discharge port 20, a thermocouple 22, and a control unit 24.

The electromagnetic source 14 is a device which generates electromagnetic energy and is comprising a magentron and a wave-guide (not shown in the drawing). The manufacturing apparatus 10 shown in FIG. 1 is equipped with two units of electromagnetic sources on both sides of the outer vessel 12 so that the intensity of the microwave energy within the outer vessel 12 becomes homogeneous. In a simplified configuration, the electromagnetic source can be just one, instead of two. In such configuration, the electromagnetic source 14 can be mounted on the upper wall of the outer vessel 12, like a microwave oven for household use.

In manufacturing carbon nanotubes, a crucible 28 into which an organic compound 26 which becomes a carbon supply source at the time of forming carbon nanotubes and a metal catalyst (hereinafter also simply referred to as metal) 27 which constitutes a catalyst for forming carbon nanotubes are put is placed in the heating vessel 16. A periphery of the crucible 28 is coated with clay 40.

The outer vessel 12 has a function of confining electromagnetic energy applied from the electromagnetic source 14 in the inside thereof. The electromagnetic source 14 applies electromagnetic energy corresponding to intensity and an energy applying time of electromagnetic energy controlled by the control unit 24. A microwave oven for household use includes the outer vessel 12, the electromagnetic source 14 and the control unit 24. Accordingly, in the method for manufacturing carbon nanotubes of the embodiment, it is possible to use such a microwave oven for household use. By using the microwave oven for household use, the manufacturing apparatus for manufacturing carbon nanotubes becomes inexpensive. Although the kind of electromagnetic energy applied from the electromagnetic source 14 is not particularly limited, it is preferable to use microwaves for increasing the speed of temperature increase, that is, the speed at which carbon nanotubes are formed.

The heating vessel 16 is a device to heat objects therein by converting electromagnetic energy to heat. The heating vessel 16 has an approximately hollow columnar shape, and is formed of two parts consisting of a bottom portion 16a and a vessel body 16b having a top plate. An inner surface of a side wall of the vessel body 16b is coated with a substance which converts electromagnetic energy into heat (not shown in the drawing). As the substance which converts electromagnetic energy into heat, a alumina, mullite, ferrite, silicon nitride, silicon carbide and the like can be named. In place of covering an inner surface of the heating vessel 16 with a substance which converts electromagnetic energy into heat, the heating vessel 16 per se may be formed using a substance which converts electromagnetic energy into heat, or a substance which converts electromagnetic energy into heat may be dispersed or impregnated into a wall of the heating vessel 16.

The gas introducing pipe 18 penetrates a bottom plate of the outer vessel 12 and the bottom portion 16a of the heating vessel 16, and a gas in the inside of the heating vessel 16 is replaced with an inert gas, for example, a noble gas such as helium or argon or a nitrogen gas. The gas discharge port 20 is formed in a center portion of the top plate of the vessel body 16b of the heating vessel 16. The gas discharge port 20 is provided for discharging the inert gas introduced into the heating vessel 16 from the gas introducing pipe 18. Further, the gas discharge port 20 also functions as an insertion hole through which a tip 22a of the thermocouple 22 is installed in the inside of the heating vessel 16.

The control unit 24 controls the intensity and the energy applying time of electromagnetic energy applied from the electromagnetic source 14. In the method for manufacturing carbon nanotubes according to the embodiment, based on information relating to the temperature in the heating vessel 16 measured by the thermocouple 22, the control unit 24 performs a control such that the temperature at which carbon nanotubes are formed, for example, a temperature of 600° C., 700° C., 800° C., 850° C. or 900° C., is constantly maintained for a predetermined time, for example, for 5 to 20 minutes.

The organic compound 26 and at least one metal catalyst 27 selected from a group consisting of iron, cobalt and nickel are put into the crucible 28, and the crucible 28 is placed in the heating vessel 16. The organic compound 26 functions as a carbon source for forming carbon nanotubes, and at least one metal catalyst 27 selected from the group consisting of iron, cobalt and nickel functions as a catalyst for forming carbon nanotubes. Provided that the organic compound 26 can supply carbon for forming carbon nanotubes at a temperature of 600° C. to 900° C., the organic compound 26 which can be used in the present invention is not particularly limited. As such an organic compound, aliphatic hydrocarbon, aromatic hydrocarbon, alcohols, phenols, aldehydes, ketones, ether groups, a carboxylic acid, amines, amides and the like can be named.

As aliphatic hydrocarbon, pentane, decane, cyclohexane and the like can be named. As aromatic hydrocarbon, toluene, naphthalene and the like can be named. As alcohols, ethanol, butanol, ethylene glycol, glycerin and the like can be named. As phenols, phenol, thymol and the like can be named. As aldehydes, formaldehyde, benzaldehyde and the like can be named. As ethers, diethyl ether, furan and the like can be named.

As ketones, diethyl ketone, cyclohexanone and the like can be named. As carboxylic acids, a stearic acid, a palmitic acid, a lauric acid and the like can be named. As amines, ethylenediamine, pyridine, aniline and the like can be named. As amides, acetamide, N, N-dimethylformamide and the like can be named.

Among these organic compounds, aliphatic hydrocarbon and aromatic hydrocarbon each consisting of carbon and hydrogen, and alcohols, phenols, aldehydes, ketones, ethers and a carboxylic acid each consisting of carbon, hydrogen and oxygen are preferable as the organic compound used in the method of manufacturing carbon nanotubes of the present invention because these organic compounds do not emit sulfur oxides and nitrogen oxides when heated. Further, while aliphatic hydrocarbon having the same carbon atoms as a carboxylic acid such as a stearic acid or a palmitic acid is in a liquid format a room temperature, the carboxylic acid such as the stearic acid or the palmitic acid is in a solid form at a room temperature so that the carboxylic acid can be easily handled. Accordingly, the carboxylic acid such as the stearic acid or the palmitic acid is more preferable as the organic compound used in the method of manufacturing carbon nanotubes of the present invention.

The crucible 28 is made of alumina, and is constituted of two approximately-bowl-shaped members consisting of a lower member 28a into which the organic compound 26 is put and an upper member 28b having an inner wall surface to which the metal catalyst 27 is adhered. That is, at least an inner surface of a top plate of the crucible 28 is coated with the metal catalyst 27, and the organic compound 26 is put into the crucible 28. Provided that the crucible 28 is formed by using a heat resistant material having a heat resistant temperature of 900° C. or more, the material of the crucible 28 is not limited to alumina. Further, to reduce the temperature difference between the outside and the inside of the crucible 28 during the formation of carbon nanotubes, it is preferable to use the crucible 28 made of a material having high heat conductivity. Further, the periphery of the crucible 28 is coated with clay 40 for preventing the oxidization of the organic compound 26 and the metal catalyst 27 and for binding the lower member 28a and the upper member 28b together. For example, stone dust clay may be used as clay 40. The clay 40 may be eliminated if the lower member 28a and the upper member 28b mate each other tightly by themselves.

The method for manufacturing carbon nanotubes according to the embodiment 1 is carried out in accordance with following steps. First of all, the organic compound 26 is put into the lower member 28a of the crucible 28. Then, a space defined in the crucible 28 is hermetically sealed by joining an opening end of the upper member 28b which has an inner wall surface thereof coated with the metal catalyst 27 and an opening end of the lower member 28a in an aligned manner. As a method for coating the inner wall surface of the upper member 28b with the metal fiber 27, several methods are considered including a method in which an aqueous solution of metal salt is applied to the inner wall surface of the upper member 28b and the upper member 28b is subject to the heat treatment at a high temperature, for example, the heat treatment at a temperature of 600° C. or more and a method in which the metal catalyst 27 is formed on the inner wall surface of the upper member 28b by vapor deposition.

Next, a periphery of the crucible 28 is coated with clay 40 and, thereafter, the crucible 28 is subject to drying treatment at a temperature of approximately 120° C. for evaporating moisture in clay. Then, the crucible 28 coated with clay 40 is placed on the bottom portion 16a of the heating vessel 16 which is fixed to the outer vessel 12. Here, a mounting base which conforms to a shape of the crucible 28 may be placed on the bottom portion 16a, and the crucible 28 may be placed on the mounting base.

Next, the vessel body 16b is placed on the bottom portion 16a so that the crucible 28 is placed in the inside of the heating vessel 16. This implies that the organic compound 26 and the metal catalyst 27 are put into the heating vessel 16. Thereafter, a tip 22a of the thermocouple 22 is brought into an area close to the crucible 28 in a state where the tip 22a of the thermocouple 22 passes through the top plate of the outer vessel 12 and the gas discharge port 20 formed in the heating vessel 16 from the outside of the manufacturing apparatus 10. Then, an inert gas is introduced into the heating vessel 16 through the gas introducing pipe 18. When a gas in the heating vessel 16 is sufficiently replaced with the inert gas, the control unit 24 performs a control so as to allow the electromagnetic source 14 to apply electromagnetic energy. The electromagnetic energy applied from the electromagnetic source 14 is applied to the heating vessel 16 so that the electromagnetic energy is converted into heat. A temperature in the heating vessel is rapidly elevated due to this heat, and the temperature in the heating vessel arrives at a carbon nanotubes forming temperature of 600° C. to 900° C.

Then, using the control unit 24, a temperature in the inside of the heating vessel is maintained at a carbon nanotubes forming temperature of 600° C. to 900° C. for several minutes. Due to such an operation, the organic compound 26 is evaporated and is brought into contact with the metal catalyst 27 so that the vaporized organic compound 26 turns into carbon nanotubes due to a catalytic action of the metal catalyst 27. Then, the application of electromagnetic energy from the electromagnetic source 14 is stopped. When several minutes elapse after the application of electromagnetic energy is stopped, the inside of heating vessel 16 is cooled down to a room temperature.

Next, the thermocouple 22 is pulled out from the gas discharge port 20, the vessel body 16b of the heating vessel 16 is lifted up, and the crucible 28 is removed from the outer vessel 12. Thus, carbon nanotubes are formed.

As described above, by putting the metal catalyst into the heating vessel which has a substance capable of converting electromagnetic energy into heat, and by bringing the organic compound into contact with the metal catalyst while maintaining the carbon-nanotubes forming temperature in the heating vessel due to the application of electromagnetic energy to the heating vessel, the carbon nanotubes can be manufactured within a short time.

Next, clay 40 formed around the crucible 28 taken out from the outer vessel 12 is removed by a cutter knife or the like and, thereafter, the upper member 28b is separated from the lower member 28a so as to open the crucible 28. A black material is adhered to an inner wall surface of the upper member 28b. This adhering material is coarse carbon nanotubes. By cleaning the coarse carbon nanotubes with an acid, water and the like, and by drying the coarse carbon nanotubes, refined carbon nanotubes are obtained.

Embodiment 2

FIG. 2 is a schematic view for explaining a manufacturing apparatus 110 used in a method for manufacturing carbon nanotubes according to the embodiment 2. FIG. 2A is a cross-sectional view of the manufacturing apparatus 110 as viewed from above, FIG. 2B is a cross-sectional view of the manufacturing apparatus 110 as viewed from a front side, FIG. 2C is an enlarged view of a portion in FIG. 2B indicated by symbol A1, and FIG. 2D is an enlarged view of a portion in FIG. 2B indicated by symbol A2. FIG. 2 shows the interior of the manufacturing apparatus 110 which is manufacturing carbon nanotubes.

The manufacturing apparatus 110 includes, as shown in FIG. 2, an outer vessel 112, an electromagnetic source 114, a heating vessel 116, a thermocouple 122, a control unit 124 and a quartz glass tube 132 which constitutes a heat-resistant tube. The quartz glass tube 132 is mounted such that a predetermined longitudinal portion of the quartz glass tube 132 is positioned in the heating vessel 116.

The electromagnetic source 114 is a device which generates electromagnetic energy and is comprising a magnetron and a wave-guide (not shown in the drawing). The manufacturing apparatus 110 shown in FIG. 2 is equipped with two units of electromagnetic sources on both sides of the outer vessel 112 so that the intensity of the microwave energy within the outer vessel 112 becomes homogeneous. In a simplified configuration, however, the electromagnetic source can be just one, instead of two. In such configuration, the electromagnetic source 14 can be mounted on the upper wall of the outer vessel 112, like a microwave oven for household use.

In manufacturing carbon nanotubes, first of all, at least one metal selected from a group consisting of iron, cobalt and nickel and an organic compound are put into the crucible 128 which constitutes a reaction vessel in a state where the metal and the organic compound are separated from each other (a step of putting the metal and the organic compound into the reaction vessel). Thereafter, in a state where the inside of the heating vessel 116 is heated at a temperature of 600° C. to 900° C. due to the application of electromagnetic energy to the heating vessel 116, the crucible 128 is gradually moved in a quartz glass tube 132 in the longitudinal direction. As a result, the crucible 126 gradually passes through the heating vessel 116. Due to such an operation, the metal 127 and the organic compound 126 are efficiently heated. Accordingly, the organic compound 126 is brought into contact with the metal 127 in the inside of the heating vessel 116 due to such heating thus forming carbon nanotubes using the organic compound 126 as a carbon source (a step of forming carbon nanotubes). Here, the crucible 128 is moved by placing the crucible 128 on a quartz glass-made conveyor 134 which gradually advances in the direction indicated by an arrow by a drive unit not shown in the drawing.

A quartz glass-made conveyer 134 can also be made of other materials than quartz glass such as ceramics so long as the material withstands a high temperature.

The outer vessel 112 has a function of confining electromagnetic energy applied from an electromagnetic source 114 in the inside thereof. The electromagnetic source 114 applies electromagnetic energy corresponding to intensity and an energy applying time of electromagnetic energy controlled by the control unit 124. Although a kind of electromagnetic energy applied from the electromagnetic source 114 is not particularly limited, it is preferable to use microwaves for increasing a temperature elevation speed, that is, a carbon-nanotubes forming speed.

The heating vessel 116 is a device to heat objects therein by converting electro-magnetic energy to heat. The heating vessel 116 has an approximately hollow columnar shape, wherein a hole is formed on both side surfaces, and an inner surface of a wall made of a heat insulating material is coated with a substance which converts electromagnetic energy into heat (not shown in the drawing). As such a substance which converts electromagnetic energy into heat, a alumina, mullite, ferrite, silicon nitride, silicon carbide and the like can be named. In place of covering an inner surface of the heating vessel 116 with a substance which converts electromagnetic energy into heat, the heating vessel 116 per se may be formed using a substance which converts electromagnetic energy into heat, or a substance which converts electromagnetic energy into heat may be dispersed or impregnated into a wall of the heating vessel 116.

The control unit 124 controls intensity and an energy applying time of electromagnetic energy applied from the electromagnetic source 114. In the method for manufacturing carbon nanotubes according to the embodiment 2, based on information relating to a temperature in the heating vessel 116 measured by the thermocouple 122, the control unit 124 performs a control such that a temperature in the heating vessel 116 is maintained at a temperature at which carbon nanotubes are formed, for example, a predetermined temperature of 600° C. to 900° C.

At least one metal 127 selected from a group consisting of iron, cobalt and nickel and the organic compound 126 are put into the crucible 128 in a state where the metal 127 and the organic compound 126 are separated from each other and, thereafter, the crucible 128 is placed on the quartz glass-made conveyer 134 which gradually advances in the direction indicated by an arrow in FIG. 2. The organic compound functions as a carbon source for forming carbon nanotubes, and at least one metal selected from a group consisting of iron, cobalt and nickel functions as a catalyst for forming carbon nanotubes.

The structures, materials and manufacturing methods of the metal 127 and the organic compound 126 are equal to the corresponding structures, materials and manufacturing methods exemplified in the embodiment 1, for example.

The quartz glass tube 132 can withstand an atmosphere under a temperature at the time of forming carbon nanotubes. The quartz glass tube 132 includes an inert gas introducing pipe. At the time of forming carbon nanotubes and before and after the formation of carbon nanotubes, an inert gas, for example, a noble gas such as helium or argon or a nitrogen gas is introduced into the quartz glass tube 132 so that a gas in the quartz glass tube 132 is replaced with the inert gas. The gas in the quartz glass tube 132 is replaced with the introduced inert gas for forming carbon nanotubes while preventing an oxidation reaction.

The method for manufacturing carbon nanotubes according to the embodiment 2 is carried out in accordance with following steps. First of all, an inert gas is introduced into the inert gas introducing pipe so as to replace a gas in the quartz glass tube 132 is sufficiently with the inert gas. Then, electromagnetic energy is applied to the heating vessel 116 so as to allow the heating vessel 116 to generate heat whereby a predetermined region in the inside of the quartz glass tube 132 is elevated to a desired predetermined temperature of 600° C. to 900° C., for example. Here, a tip 122a of the thermocouple 122 is placed in the predetermined region of the quartz glass tube 132, and an output of the control device 124 is controlled based on information relating to a temperature detected by the thermocouple 122. Thereafter, in a state where such a temperature is maintained, the crucible 128 into which the metal 127 and the organic compound 126 are put is placed on the quartz glass-made conveyer 134 which gradually advances in the direction indicated by an arrow in FIG. 2.

As a result, the crucible 128 gradually passes through the heating vessel 116 and hence, it is possible to heat the crucible 128 kiln for a required time. The crucible 128 which has passed through the predetermined region of the quartz glass tube 132 is gradually cooled, and is cooled down to a temperature close to a room temperature when the crucible 128 arrives at an exit of the quartz glass tube 132. According to the method for manufacturing carbon nanotubes of the embodiment 2, by preparing a plurality of crucibles 128 and by sequentially placing these crucibles 128 on the conveyer, it is possible to manufacture carbon nanotubes with high productivity.

Besides the method for manufacturing carbon nanotubes according to the embodiment 1 and the method for manufacturing carbon nanotubes according to the embodiment 2, the following method for manufacturing carbon nanotubes can be adopted. That is, to explain this method for manufacturing carbon nanotubes in conjunction with FIG. 1, the method includes a step of forming carbon nanotubes by supplying an inert gas and an organic compound in the inside of the heating vessel 16 while maintaining the inside of the heating vessel 16 into which a metal catalyst 27 is put at a temperature of 600° C. to 900° C. The inert gas is supplied to the inside of the heating vessel 16 so that carbon nanotubes can be manufactured while preventing an oxidation reaction under an atmosphere of the inert gas. Further, the organic compound supplied to the inside of the heating vessel 16 is heated at a temperature of 600° C. to 900° C. in the inside of the heating vessel 16 and supplies carbon to the metal catalyst 27. Carbon supplied to the metal catalyst 27 is precipitated thus forming carbon nanotubes using the metal catalyst 27 as a starting point. In this method, a quantity of organic compound supplied to the metal catalyst 27, that is, a quantity of carbon source can be adjusted and hence, it is possible to supply a quantity of organic compound which does not exceed carbon-nanotubes forming ability of the metal catalyst 27. Accordingly, it is possible to manufacture carbon nanotubes in which a rate of carbon having the amorphous structure is low and a rate of carbon having the graphite structure is high.

As a mode in which carbon nanotubes are manufactured by such a method, the apparatus for manufacturing carbon nanotubes may be modified as follows so that carbon nanotubes may be manufactured without using the crucible 28, for example. That is, a substrate which has at least one surface thereof coated with the metal catalyst 27 is placed in an upper portion of the inside of the heating vessel 16 with the surface coated with the metal catalyst 27 directed downwardly. Then, the inert gas and the organic compound are introduced into the heating vessel 16 through the gas introducing pipe 18 and are directed toward the metal catalyst 27 formed on the substrate while maintaining the inside of the heating vessel 16 at a temperature of 600° C. to 900° C. Here, two gas introducing pipes 18 may be provided so as to introduce the inert gas and the organic compound independently through the respective gas introducing pipes 18.

As such an organic compound, in view of the easiness of the supply of the organic compound to the inside of the heating vessel 16, it is preferable to use an organic compound which takes a gaseous form at a room temperature including hydrocarbon such as methane, ethane, propane, ethylene or acetylene, for example, or an organic compound which takes a liquid form at a room temperature but has a low boiling point including alcohol such as methanol or ethanol, hydrocarbon such as pentane or hexane, and ether such as dimethylether or tetrahydrofuran.

Among these organic compounds, in view of the easiness of the supply of the organic compound to the inside of the heating vessel 16 and a high rate of carbon content in the organic compound, it is preferable to use hydrocarbon which takes a gaseous form at a room temperature. To supply the organic compound which takes a liquid form at a room temperature into the heating vessel 16, the organic compound may be heated outside the heating vessel 16 and the organic compound in a gaseous form may be supplied to the inside of the heating vessel 16 through the gas introducing pipe 18.

Example

1. Manufacturing Apparatus for Manufacturing Carbon Nanotubes

A microwave oven for household use (ES-HA196 made by ZOJIRUSHI CORPORATION) is remodeled and is used as the manufacturing apparatus 10. That is, the remodeling of the microwave oven is performed such that the thermocouple 22 is mounted on the microwave oven so as to adjust a temperature inside the heating vessel 16, and an operation unit (corresponding to the control unit 24) of the microwave oven is remodeled to adjust an output of electromagnetic energy based on temperature information obtained from the thermocouple 22. As the heating vessel 16, a kiln (generic name: microwave kiln; product name: Art Box) which elevates a temperature of the inside thereof due to microwaves of the microwave oven is used.

2. Manufacture of Carbon Nanotubes

Example (1) Preparation of Metal Catalyst 3.00 g of nickel chloride hexahydrate ($NiCl_2.6H_2O$) (manufactured by Wako Chemical Co., Ltd.) is put into a lower member of an alumina-made crucible having the same two-split structure as the crucible 28 shown in FIG. 1. The inside of the crucible is hermetically sealed by placing an upper member of the crucible on the lower member of the crucible as a lid, and a periphery of the crucible 28 is covered with clay. The crucible covered with clay is put into a dryer, and clay is dried at a temperature of 120° C. for 5 minutes. Thereafter, the crucible is placed in a kiln installed in a microwave oven. Then, in a state where the inside of the kiln is under a nitrogen gas atmosphere, microwave energy (output: 600 W) is applied to the kiln for elevating a temperature in the kiln to 850° C. Subsequently, microwave energy is continuously applied to the kiln thus maintaining the temperature in the kiln at 850° C. for 5 minutes and, thereafter, the application of microwave energy is stopped. When the crucible is taken out from the microwave oven, nickel particles are adhered to an inner wall surface of the lower member of the crucible. In succeeding steps, the nickel particles are used as a metal catalyst.

(2) Formation of Carbon Nanotubes

The lower member having the inner wall surface to which the nickel particles obtained by the above-mentioned step of preparing the metal catalyst are adhered is used as the upper member 28b of the crucible 28 shown in FIG. 1 in this step of forming carbon nanotubes. That is, as shown in FIG. 1, 4.00 g of stearic acid (manufactured by Wako chemical Co., LTd.) is put into the lower member 28a. Then, the upper member 28b having the inner wall surface to which the nickel particles are adhered is placed on the lower lid 28a as a lid so as to hermetically seal the inside of the crucible 28. Thereafter, a periphery of the crucible 28 is coated with clay 40. The crucible 28 coated with clay 40 is placed in a dryer so as to dry clay 40 at a temperature of 120° C. for 5 minutes.

Thereafter, the crucible 28 is placed in the kiln installed in the microwave oven. A gas in the kiln is replaced with a nitrogen gas for 10 minutes. Then, in a state where the inside of the kiln is under nitrogen gas atmosphere, microwave energy (output: 600 W) is applied to the kiln for 5 minutes thus elevating a temperature in the kiln to 850° C. Subsequently, microwave energy is continuously applied to the kiln thus maintaining the temperature in the kiln at 850° C. for 5 minutes and, thereafter, the application of microwave energy is stopped. When 5 minutes elapse from stopping of application of microwave energy, the temperature in the kiln is lowered to a room temperature.

The crucible 28 is taken out from the inside of the microwave oven, and 0.80 g of coarse carbon nanotubes adhered to the inner wall surface of the upper member 28b of the crucible 28 are collected. In this manner, according to the method for manufacturing carbon nanotubes of this embodiment, all steps from starting heating of the material to collecting of coarse carbon nanotubes can be carried out in a short time of approximately 15 minutes. A yield of carbon nanotubes at a stage of coarse nanotubes is 20.0%. This yield is calculated based on carbon content of a stearic acid.

Next, to remove nickel particles contained in coarse carbon nanotubes, coarse carbon nanotubes are put into a test tube, and 8 ml of a concentrated hydrochloric acid is added to coarse carbon nanotubes. This test tube is immersed into water in a water bath of an ultrasonic cleaner (UT-105S made by Sharp Corporation) and ultrasonic cleaning is applied to the test tube for one hour. After leaving the test tube on a test tube stand overnight, black powder is precipitated on a bottom of the test tube. A supernatant liquid in a test tube is removed by a pipette and, thereafter, the addition of 8 ml of water and the removal of a supernatant liquid by the pipette are repeated several times until cleaning water has no color. Next, black powder is dried under reduced pressure thus obtaining 0.17 g of refined carbon nanotubes. A yield calculated based on carbon content of stearic acid was 4.3%.

Comparison Example

In the example, the lower member having the inner wall surface to which the nickel particles are adhered is used as the upper member 28b of the crucible 28. In the comparison example, the lower member having the inner wall surface to which the nickel particles are adhered is used as the lower member 28a of the crucible 28. Carbon nanotubes are manufactured in the same manner as the example except for this difference. That is, a stearic acid is put into the lower member 28a having the inner wall surface to which the nickel particles are adhered, the empty upper member 28b is placed on the lower member 28a as a lid so as to hermetically seal the inside of the crucible 28. Thereafter, an attempt to manufacture carbon nanotubes is made in the same manner as the example. As a result, the comparison example cannot manufacture carbon nanotubes. It is estimated that carbon contained in the stearic acid moves upwardly, that is, in the direction away from nickel particles when the inside of the kiln is heated.

Other Examples

Carbon nanotubes are manufactured by setting the temperature in the kiln at the time of forming carbon nanotubes at five temperature conditions of 500° C., 600° C., 700° C., 800° C. and 900° C. in place of 850° C. used in the above-mentioned example. As a result, although carbon nanotubes are formed at four temperature conditions of 600° C., 700° C., 800° C. and 900° C., carbon nanotubes are not formed at the temperature condition of 500° C.

Carbon nanotubes are manufactured by setting a holding time of the temperature in the kiln at the time of forming carbon nanotubes at three conditions of 10 minutes, 15 minutes and 20 minutes in place of 5 minutes in the example. As a result, kiln a small quantity of carbon nanotubes is formed when the holding time of the reaction temperature in the kiln is 20 minutes. It is considered that the hermetic property of the crucible is not high so that when the reaction time is excessively prolonged, air enters the crucible so that the carbon source present in the crucible reacts with air and a gas generated by such a reaction is removed from a reaction system as a carbon dioxide gas.

3. Analysis of Carbon Nanotubes (TEM Image)

Figure 3A:
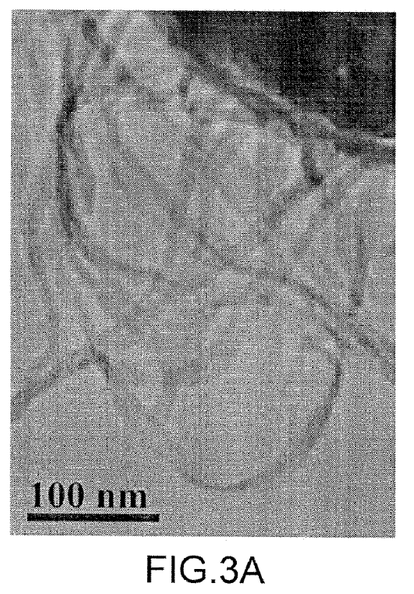
FIG. 3 is a TEM image of carbon nanotubes manufactured in an example.
Figure 3B:
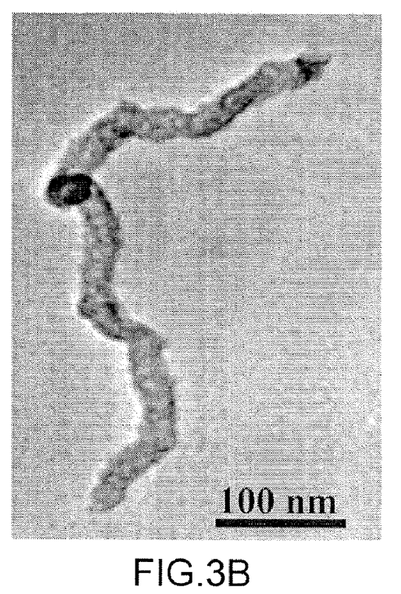
Figure 4:
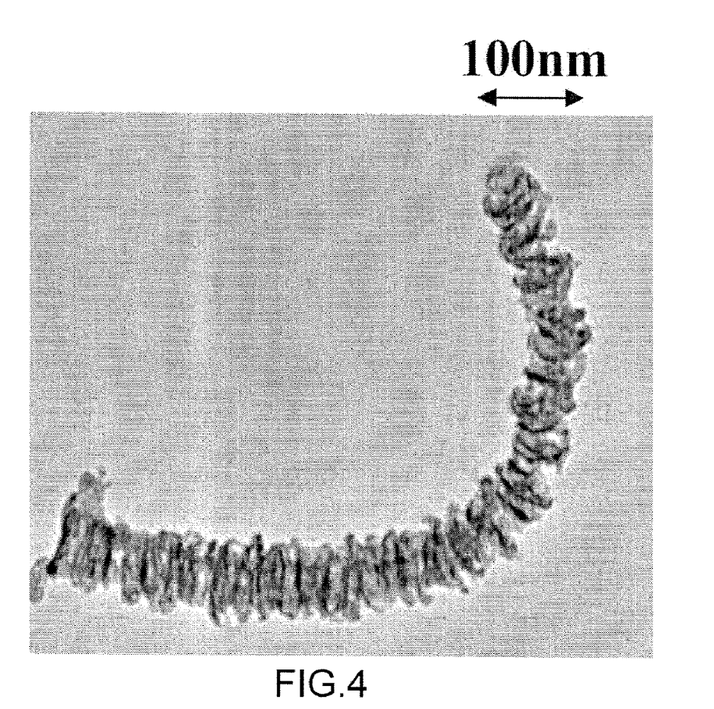
FIG. 4 is a TEM image of cup-stacked-type carbon nanotubes manufactured in the example.

FIG. 3A, FIG. 3B and FIG. 4 show TEM images of carbon nanotubes manufactured in the example. It is understood from FIG. 3A and FIG. 3B that carbon nanotubes grow from surfaces of nickel particles. Further, cup-stacked-type carbon nanotubes shown in FIG. 4 are also obtained although a quantity of such carbon nanotubes is small. It is understood from FIG. 3A and FIG. 3B that diameters of carbon nanotubes shown in FIG. 3A and FIG. 3B fall within a range from 10 to 30 nm. It is considered that the formed carbon nanotubes are multi wall carbon nanotubes (MWCNT) judging from these diameters.

(Raman Spectrum)

Figure 5:
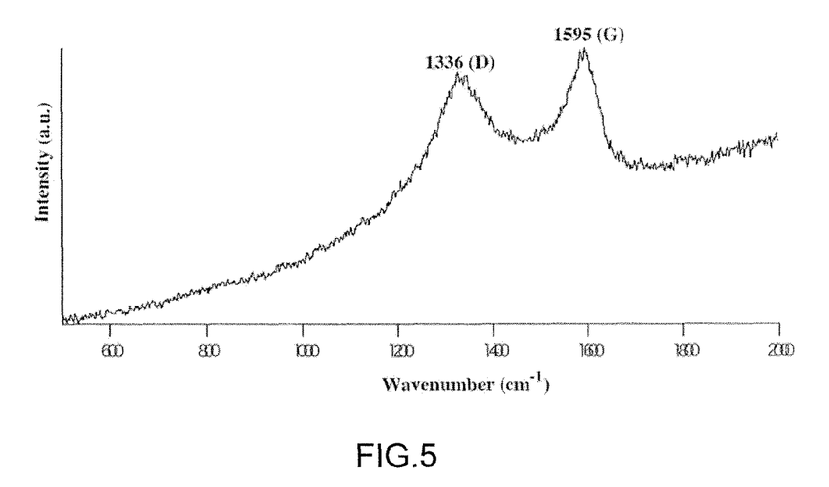
FIG. 5 is a view showing a Raman spectrum of carbon nanotubes manufactured in the example.

FIG. 5 shows a Raman spectrum of carbon nanotubes manufactured in the example. As shown in FIG. 5, carbon nanotubes manufactured in the example have a peak of a G band attributed to the graphite structure at 1595 $cm^{-1}$ and a peak of a D band attributed to a defect of the graphite structure and the amorphous structure at 1336 $cm^{-1}$. A peak intensity ratio between the G band and the D band, that is, "peak intensity of G band/peak intensity of D band" is 1.05. Since the peak intensity of the D band is large, it is estimated that a large quantity of amorphous carbon is formed. This is considered to imply that a quantity of organic compound, that is, a quantity of carbon source cannot be adjusted and hence, a quantity of carbon which exceeds carbon-nanotubes forming ability of catalyst metal is supplied to the catalyst metal.

(Magnetism)

Carbon nanotubes manufactured in the example are not attracted by a magnet. On the other hand, although carbon nanotubes which are manufactured by heating nickel stearate at a temperature of 800° C. in an electric furnace (see non-patent document 1) are manufactured using a material similar to the material used in the method for manufacturing carbon nanotubes according to the example, such carbon nanotubes contain nickel therein so that the carbon nanotubes have magnetism. Accordingly, when it is necessary to obtain carbon nanotubes which do not contain metal particles therein, that is, the carbon nanotubes having no magnetism, the method for manufacturing carbon nanotubes according to the example may be used in place of the method described in non-patent document 1.

(Formation Mechanism)

Figure 6:
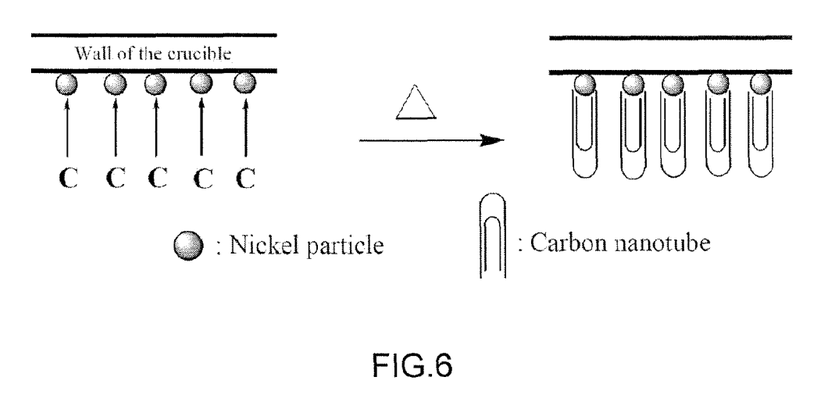
FIG. 6 is a conceptual view showing a formation mechanism of carbon nanotubes in the example.

FIG. 6 shows what is considered to be a mechanism for forming carbon nanotubes in the example. That is, when a stearic acid is heated at a temperature of 600° C. to 900° C., carbon in the stearic acid is precipitated on surfaces of nickel particles present on an inner side of a top plate of a crucible, and carbon nanotubes grow using the nickel particles as a starting point.

The invention claimed is:

1. A method for manufacturing carbon nanotubes comprising the steps of:
preparing at least one metal selected from a group consisting of iron, cobalt and nickel and an organic compound; and
forming carbon nanotubes by using the organic compound as a carbon source, wherein the metal and the organic compound are put into a heating vessel having a substance capable of converting electromagnetic energy into heat, and the organic compound is brought into contact with the metal in a state where the inside of the heating vessel is heated at a temperature of 600° C. to 900° C. by applying the electromagnetic energy to the heating vessel so as to form the carbon nanotubes;
wherein the method further comprises a step of putting the metal and the organic compound into a reaction vessel in a state where the metal and the organic compound are separated from each other between the step of preparing the metal and the organic compound and the step of forming the carbon nanotubes;
in the step of forming the carbon nanotubes, the organic compound is brought into contact with the metal in the inside of the reaction vessel;
wherein in the step of forming the carbon nanotubes, the reaction vessel is placed in the inside of the heating vessel and, thereafter, the electromagnetic energy is applied to the heating vessel so as to heat the inside of the heating vessel at a temperature of 600° C. to 900° C.; and
wherein the substance capable of converting electromagnetic energy into heat is at least one selected from a group of substances consisting of a alumina, mullite, ferrite, silicon nitride and silicon carbide.

2. A method for manufacturing carbon nanotubes according to claim 1, wherein the step of forming the carbon nanotubes includes a step of feeding an inert gas and the organic compound to the inside of the heating vessel.

3. A method for manufacturing carbon nanotubes according to claim 1, wherein the metal is nickel.

4. A method for manufacturing carbon nanotubes according to claim 1, wherein the organic compound is a stearic acid.

5. A method for manufacturing carbon nanotubes comprising the steps of:
preparing at least one metal selected from a group consisting of iron, cobalt and nickel and an organic compound; and
forming carbon nanotubes by using the organic compound as a carbon source, wherein the metal and the organic compound are put into a heating vessel having a substance capable of converting electromagnetic energy into heat, and the organic compound is brought into contact with the metal in a state where the inside of the heating vessel is heated at a temperature of 600° C. to 900° C. by applying the electromagnetic energy to the heating vessel so as to form the carbon nanotubes;
wherein the method further comprises a step of putting the metal and the organic compound into a reaction vessel in a state where the metal and the organic compound are separated from each other between the step of preparing the metal and the organic compound and the step of forming the carbon nanotubes;
in the step of forming the carbon nanotubes, the organic compound is brought into contact with the metal in the inside of the reaction vessel;
wherein in the step of forming the carbon nanotubes, the reaction vessel gradually passes through the heating vessel in a state where the inside of the heating vessel is heated at a temperature of 600° C. to 900° C. by applying the electromagnetic energy to the heating vessel; and
wherein the substance capable of converting electromagnetic energy into heat is at least one selected from a group of substances consisting of a alumina, mullite, ferrite, silicon nitride and silicon carbide.

6. A method for manufacturing carbon nanotubes according to claim 5, wherein in the step of forming the carbon nanotubes, in a state where a predetermined longitudinal portion of a heat resistant tube is arranged in the inside of the heating vessel, the reaction vessel gradually passes through the heating vessel by gradually moving the reaction vessel in the heat resistant tube in the longitudinal direction.

7. A method for manufacturing carbon nanotubes according to claim 5, wherein the step of forming the carbon nanotubes includes a step of feeding an inert gas and the organic compound to the inside of the heating vessel.

8. A method for manufacturing carbon nanotubes according to claim 5, wherein the metal is nickel.

9. A method for manufacturing carbon nanotubes according to claim 5, wherein the organic compound is a stearic acid.

10. A method for manufacturing carbon nanotubes comprising the steps of:
preparing at least one metal selected from a group consisting of iron, cobalt and nickel and an organic compound; and
forming carbon nanotubes by using the organic compound as a carbon source, wherein the metal and the organic compound are put into a heating vessel having a substance capable of converting electromagnetic energy into heat, and the organic compound is brought into contact with the metal in a state where the inside of the heating vessel is heated at a temperature of 600° C. to 900° C. by applying the electromagnetic energy to the heating vessel so as to form the carbon nanotubes;
wherein the method further comprises a step of putting the metal and the organic compound into a reaction vessel in a state where the metal and the organic compound are separated from each other between the step of preparing the metal and the organic compound and the step of forming the carbon nanotubes;
in the step of forming the carbon nanotubes, the organic compound is brought into contact with the metal in the inside of the reaction vessel; and
wherein in the step of putting the metal and the organic compound into the reaction vessel, the metal is put into the reaction vessel in a state where the metal is fixed to an upper portion of the reaction vessel, and the organic compound is put into a lower portion of the reaction vessel.

11. A method for manufacturing carbon nanotubes according to claim 10, wherein the step of forming the carbon nanotubes includes a step of feeding an inert gas and the organic compound to the inside of the heating vessel.

12. A method for manufacturing carbon nanotubes according to claim 10, wherein the metal is nickel.

13. A method for manufacturing carbon nanotubes according to claim 10, wherein the organic compound is a stearic acid.

14. A method for manufacturing carbon nanotubes according to claim 10, wherein the substance capable of converting electromagnetic energy into heat is at least one selected from a group of substances consisting of a alumina, mullite, ferrite, silicon nitride and silicon carbide.

15. A method for manufacturing carbon nanotubes according to claim 10, wherein the reaction vessel is a crucible, and the metal is coated to the inner surface of the top plate of the crucible in the step of putting the metal and the organic compound into the reaction vessel.

16. A method for manufacturing carbon nanotubes according to claim 15, wherein in the step of putting the metal and the organic compound into the reaction vessel, a periphery of the crucible is coated with clay after the metal and the organic compound are put into the crucible.

* * * * *